(12) United States Patent
Imai et al.

(10) Patent No.: US 9,893,647 B2
(45) Date of Patent: Feb. 13, 2018

(54) RESONANT INVERTER AND SWITCHING POWER SOURCE UNIT

(71) Applicant: TDK CORPORATION, Tokyo (JP)

(72) Inventors: Katsunori Imai, Tokyo (JP); Kenji Furukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 103 days.

(21) Appl. No.: 15/043,193

(22) Filed: Feb. 12, 2016

(65) Prior Publication Data

US 2016/0241128 A1   Aug. 18, 2016

(30) Foreign Application Priority Data

Feb. 16, 2015  (JP) ................. 2015-027363

(51) Int. Cl.
*H02M 3/335* (2006.01)
*H02M 1/00* (2006.01)
*H02M 7/537* (2006.01)
*H02M 7/48* (2007.01)

(52) U.S. Cl.
CPC .... *H02M 7/537* (2013.01); *H02M 2007/4815* (2013.01); *Y02B 70/1441* (2013.01)

(58) Field of Classification Search
CPC ....... H02M 1/4241; H02M 2007/4815; H02M 2007/4818

USPC ............................ 363/21.02, 21.03, 78, 124
See application file for complete search history.

(56) References Cited

U.S. PATENT DOCUMENTS

| | | | | |
|---|---|---|---|---|
| 3,461,372 A | * | 8/1969 | Barton | H02M 7/537 327/129 |
| 6,822,881 B2 | * | 11/2004 | Elferich | H02M 3/33561 363/21.02 |
| 7,184,280 B2 | * | 2/2007 | Sun | H02M 3/33592 363/127 |
| 7,889,519 B2 | * | 2/2011 | Perreault | H02M 1/34 323/222 |
| 2007/0109820 A1 | * | 5/2007 | Yang | H02M 3/33507 363/21.03 |

* cited by examiner

*Primary Examiner* — Gary Nash
(74) *Attorney, Agent, or Firm* — Oliff PLC

(57) ABSTRACT

A resonance inverter includes a first coil provided between an input terminal and a switch element, a first capacitor provided between the drain and the source of the switch element, a second capacitor serially connected between the drain and the source of the switch element, and a second coil. A drain-source voltage of a switch element can be effectively lowered, by setting a serial resonance frequency based on the second coil and the second capacitor to a value higher than twice of a driving frequency, and lower than 2.75 times thereof.

11 Claims, 7 Drawing Sheets

FIG. 7
RELATED ART
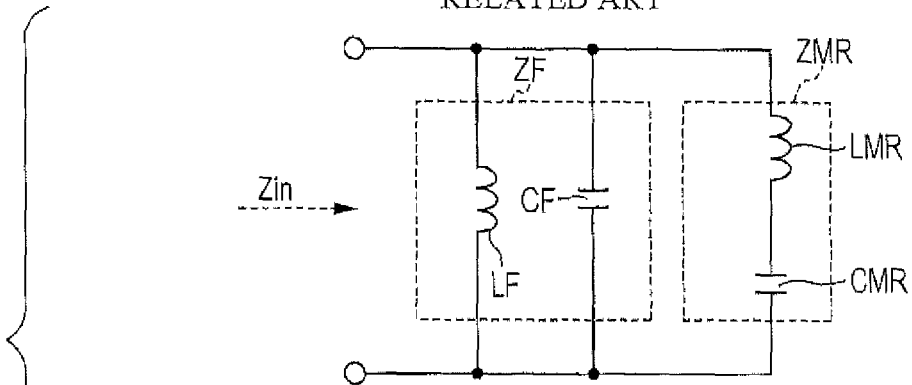
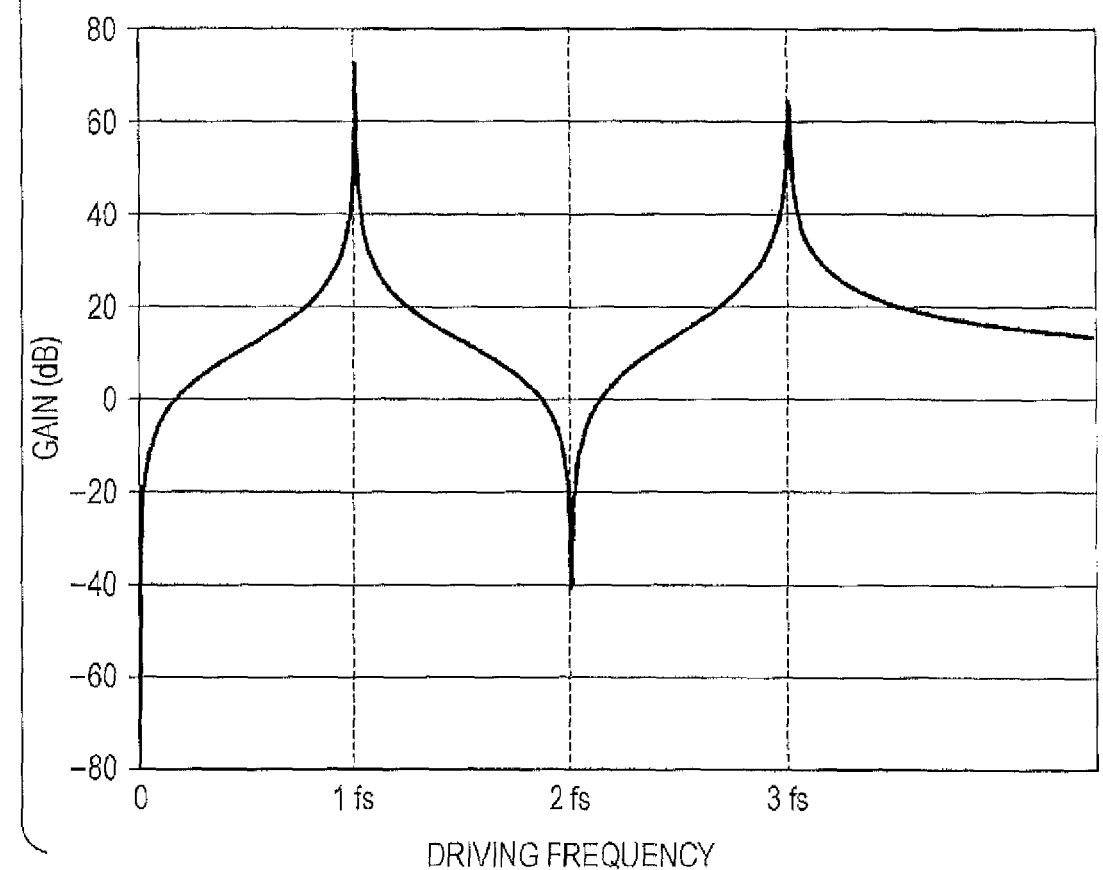
DRIVING FREQUENCY

RESONANT INVERTER AND SWITCHING POWER SOURCE UNIT

BACKGROUND OF THE INVENTION

1. Field of the Invention

The present invention relates to a resonant inverter and a switching power source unit that easily lower an operating voltage of a switch element.

2. Description of the Related Art

U.S. Pat. No. 3,461,372 discloses a resonant inverter having a plurality of resonance frequencies. A feature of the resonant inverter is that a plurality of parallel resonance circuits, each having a resonance frequency that is an odd multiple of the driving frequency, are connected between the collector and the output of a switch element, and a plurality of serial resonance circuits, each having a resonance frequency that is an even multiple of the driving frequency, are connected between the collector and the emitter of the switch element. With the resonant inverter configured as above, when a square wave is applied between the base and the emitter of the switch element, the waveform between the collector and the emitter of the switch element assumes a square wave form. This is because the even multiple components of the driving frequency, namely the components of twice, four times, and six times of the driving frequency have low impedance, and therefore the even multiple components higher than eight times having a small energy, and the odd multiple components expressed as fundamental, three times, five times, . . . , are added in the waveform between the collector and the emitter of the switch element (see FIG. 6). In the resonant inverter the three times, five times, and seven times components, which are the odd multiple components of the waveform between the collector and the emitter of the switch element, are blocked by parallel resonance, and therefore an output voltage of a sine wave shape equal to the fundamental frequency having a largest energy can be provided to the output end.

A resonant converter proposed in U.S. Pat. No. 7,889,519 includes, in a resonant inverter unit, an LC serial resonance circuit having a resonance frequency that is twice of a driving frequency and provided between the drain and the source (between the collector and the emitter) of a switch element. With this circuit, a collector-emitter (drain-source) voltage of the switch can be lowered compared with a conventional resonant inverter, by arranging the inverter unit such that drain-source (collector-emitter) impedance of the switch element becomes lowest around the frequency 0 and twice of the driving frequency (see FIG. 7), according to the cited Literature. Thus, the conventional techniques have focused on shaping the switch waveform to realize an ideal action, to thereby improve the operating voltage of the switch element.

With the conventional resonant converter cited above, however, when the LC serial resonance circuit having the resonance frequency that is twice of the driving frequency is provided between the collector and the emitter (the drain and the source) of the switch element in the resonant inverter unit, the operating voltage of the switch element does not always become lowest and hence the life span of the switch may be degraded. The present invention has been accomplished in view of the drawbacks incidental to the conventional technique, and provides a resonant inverter and a switching power source unit that are reliable and do not affect the life span of the switch element.

SUMMARY OF THE INVENTION

In an aspect, the present invention provides a resonant inverter including a switch element and at least four energy storage elements, the resonant inverter being configured so as to satisfy $2\,fs < F2 \leq 2.75\,fs$, where $fs$ denotes a driving frequency in which the switch element is driven, and $F2$ denotes a resonance frequency generated by at least two of the energy storage elements resonate. Such a configuration lowers the operating voltage of the switch element.

In the resonant inverter configured as above, the four energy storage elements may be, respectively, a first coil provided between a first input terminal and the switch element, a first capacitor disposed parallel to the switch element, and a second coil and a second capacitor provided between the first coil and a second input terminal and serially connected to each other.

Such a configuration lowers the operating voltage of the switch element.

In the resonant inverter configured as above, the resonance frequency $F2$ may include at least three resonance points, and when a first resonance point is fixed at the driving frequency and a third resonance point is fixed at three times of the driving frequency, a resonance point that satisfies $2\,fs < F2 \leq 2.75\,fs$ may be a second resonance point.

Such a configuration lowers the operating voltage of the switch element.

In the resonant inverter configured as above, the switch element may perform zero-volt switching. Such a configuration further assures the lowering effect of the operating voltage of the switch element, and allows the switch element to be turned on at an appropriate timing.

In the resonant inverter configured as above, an amplitude indicating the impedance of the switch element may become lowest when the resonance frequency $F2$ based on serially resonance of the second coil and the second capacitor satisfies $2.5\,fs \leq F2 \leq 2.6\,fs$.

Such a configuration lowers the operating voltage of the switch element.

With the mentioned configuration according to the present invention, a resonant inverter and a switching power source unit that are reliable and do not affect the life span of the switch element can be obtained.

BRIEF DESCRIPTION OF THE DRAWINGS

FIG. 7 is an explanatory graph showing drain-source (collector-emitter) impedance of a switch element of the conventional resonant inverter.

DESCRIPTION OF THE PREFERRED EMBODIMENTS

Figure 1:
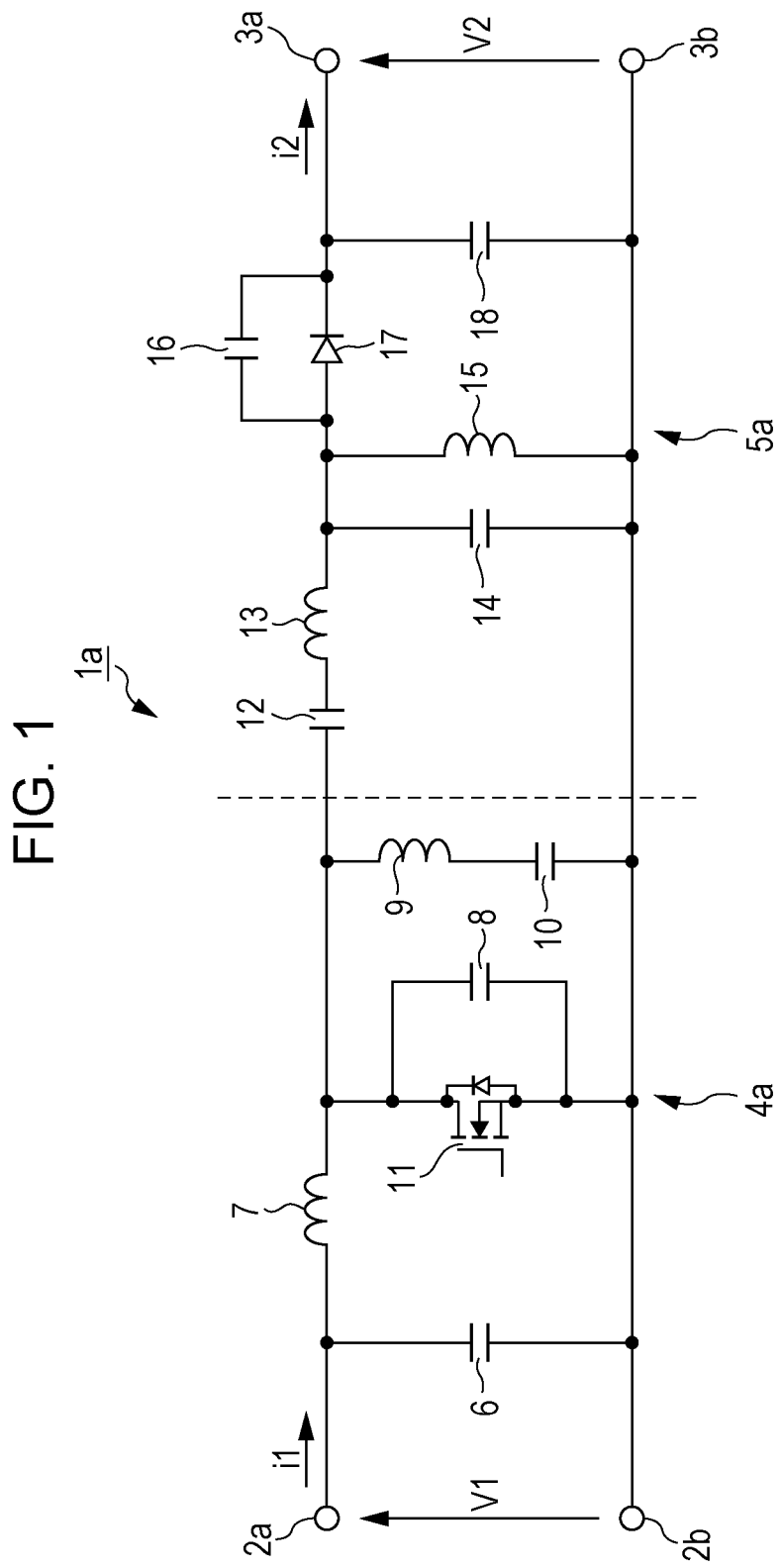
FIG. 1 is a circuit diagram of a switching power source unit including a resonant inverter according to the present invention.

Hereafter, an exemplary embodiment of the present invention will be described. However, the present invention is not limited to the embodiment described hereunder. The constituents referred to hereunder may include those that can be easily reached by persons skilled in the art, or constituents substantially the same as those, and such constituents may be combined as desired.

The embodiment of the present invention will be described in details with reference to the drawings. In the drawings the same constituents will be given the same numeral, and the description thereof will not be repeated.

FIG. 1 is a circuit diagram showing a configuration of a switching power source unit 1a according to the embodiment of the present invention. The switching power source unit 1a shown in FIG. 1 includes a pair of input terminals 2a, 2b (or simply input terminal 2 when distinction is unnecessary), output terminals 3a, 3b (or simply output terminal 3 when distinction is unnecessary), a resonant inverter 4a, and a resonant rectifier 5a, and is configured to convert an input voltage (DC voltage) V1 received through the input terminal 2 into an output voltage (DC voltage) V2, and output the output voltage V2 from the output terminal 3. The switching power source unit 1a receives the input voltage V1, and an input current i1 through the input terminal 2, and outputs the output voltage V2 and a load current i2 from the output terminal 3.

The resonant inverter 4a includes a switch element 11, an input capacitor 6, a first resonant choke coil 7, a first resonant capacitor 8, a second resonant choke coil 9, and a second resonant capacitor 10. The resonant inverter 4a includes two resonance circuits. A first resonance circuit is arranged along a route including the first input terminal 2a, the first resonant coil 7, the first resonant capacitor 8, and the second input terminal 2b. A second resonance circuit is arranged along a route including the first input terminal 2a, the first resonant coil 7, the second choke coil 9, the second resonant capacitor 10, and the second input terminal 2b. The first coil 7, the first capacitor 8, the second coil 9, and the second capacitor 10 exemplify the four storage elements in the present invention. The switching power source unit 1a is, for example, based on a resonant step-down converter circuit, and converts the input voltage V1 received through the input terminal 2 into an AC voltage, and transmits the AC voltage to the resonant rectifier 5a. The switch element 11 includes a reverse conducting diode so as to cause a current to flow from the 2b toward the input terminal 2a. In the switch element 11, an inter-terminal capacitance is also provided between the input terminals 2b, 2a. In this embodiment, the inter-terminal capacitance is assumed to be included in the resonant capacitor 8. A non-illustrated control circuit is connected to the switch element 11, so as to perform on/off control of the switch element 11 on the basis of driving signals from the control circuit.

The resonant rectifier 5a includes a rectifier diode 17, a capacitor 16 disposed parallel to the rectifier diode 17, an output capacitor 18, a third resonant choke coil 13, a third resonant capacitor 12, a fourth resonant choke coil 15, and a fourth resonant capacitor 14. The resonant rectifier 5a converts the inputted AC voltage generated by the resonant inverter 4a and into the output voltage V2 through rectification and smoothing, and outputs the output voltage V2 from the output terminal 3.

Figure 3:
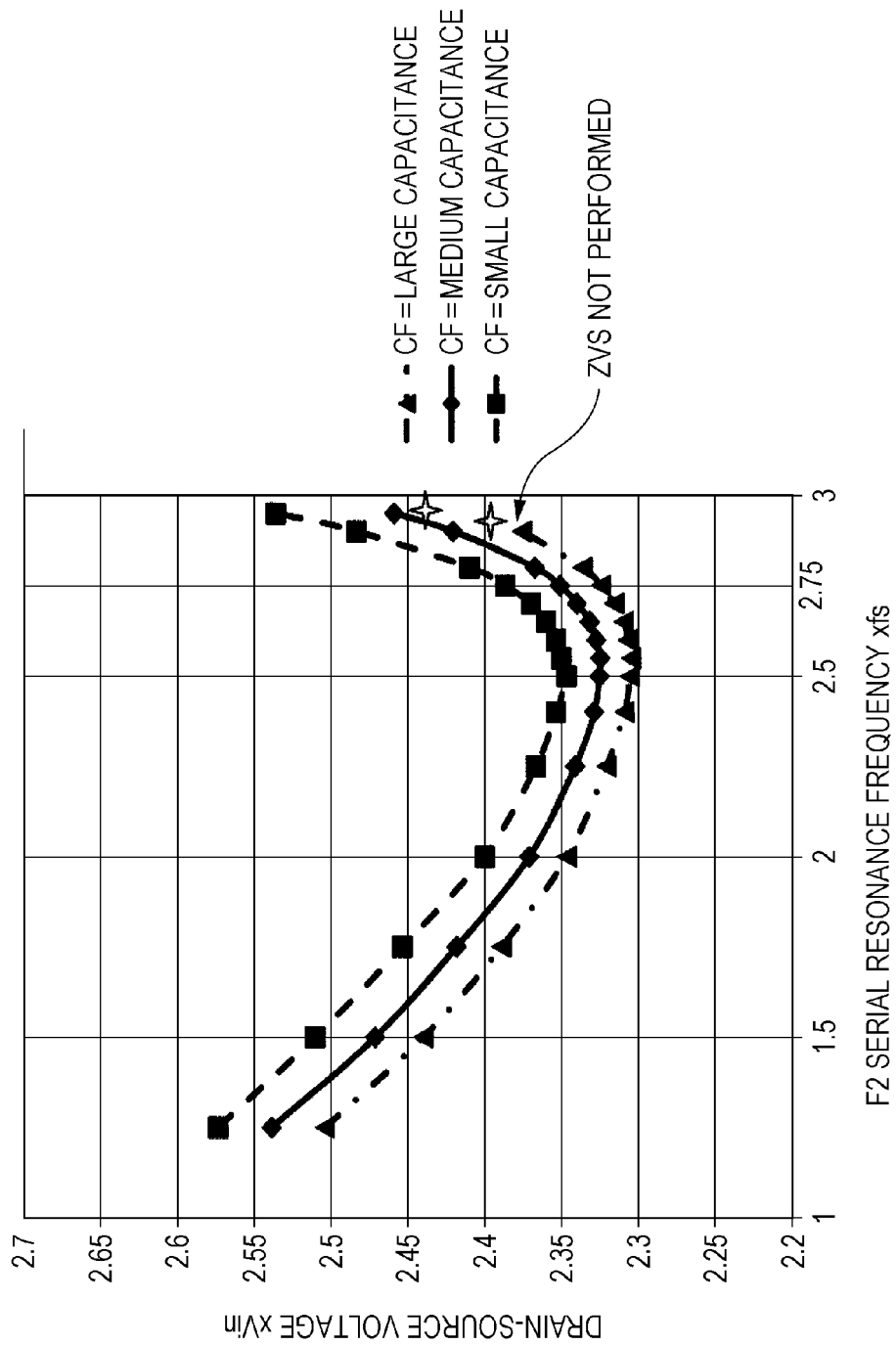
FIG. 3 is an explanatory graph showing serial resonance frequency and operating voltage of the switch element in the resonant inverter according to the present invention.

FIG. 3 is an explanatory graph showing the serial resonance frequency F2 of the resonant converter 1a and the drain-source voltage of the switch element 11 shown in FIG. 1. The vertical axis represents the drain-source voltage of the switch element 11 normalized with the input voltage, and the horizontal axis represents the serial resonance frequency F2 normalized with the driving frequency fs. The line including triangular dots represents the case where the first resonant capacitor 8 has a large capacitance, the line including diamond-shaped dots represents the case where the first resonant capacitor 8 has a medium capacitance, and the line including rectangular dots represents the case where the first resonant capacitor 8 has a small capacitance.

Regarding the relationship between the serial resonance frequency and the operating voltage of the switch element 11 (see FIG. 3) with respect to the variation of the serial resonance frequency F2 of the serial resonance circuit provided between the drain and the source of the switch element 11 in the resonant inverter 4a, the drain-source (collector-emitter) voltage of the switch element can be lowered by setting the serial resonance frequency F2 in a region higher than twice of the driving frequency fs of the switch element but lower than 2.75 times, compared with the case where the serial resonance frequency is set to twice. For example, when the input voltage is denoted by Vin, the drain-source voltage is 2.4 Vin when the first resonant capacitor 8 has a small capacitance and the serial resonance frequency F2 is twice of the driving frequency, and drops in the range from twice to 2.5 times of the driving frequency, reaching 2.35 Vin which is the bottom, at 2.5 times of the driving frequency. Thereafter, the drain-source voltage rises, and reaches 2.39 Vin when the serial resonance frequency F2 is 2.75 times of the driving frequency, then 2.41 Vin at 2.8 times of the driving frequency.

When the first resonant capacitor 8 has a medium capacitance, the drain-source voltage is 2.37 Vin when the serial resonance frequency F2 is twice of the driving frequency, and drops in the range from twice to 2.55 times of the driving frequency, reaching 2.33 Vin which is the bottom, at 2.55 times of the driving frequency. Thereafter, the drain-source voltage rises, and reaches 2.35 Vin when the serial resonance frequency F2 is 2.75 times of the driving frequency, then 2.37 Vin at 2.8 times of the driving frequency.

When the first resonant capacitor 8 has a large capacitance, the drain-source voltage is 2.35 Vin when the serial resonance frequency F2 is twice of the driving frequency, and drops in the range from twice to 2.6 times of the driving frequency, reaching 2.31 Vin which is the bottom, at 2.6 times of the driving frequency. Thereafter, the drain-source voltage rises, and reaches 2.33 Vin when the serial resonance frequency F2 is 2.75 times of the driving frequency, then 2.34 Vin at 2.8 times of the driving frequency.

Thus, regardless of whether the first resonant capacitor 8 has a small capacitance or large capacitance, the drain-source voltage can be lowered when the serial resonance frequency F2 satisfies 2 fs<F2≤2.75 fs, where fs denotes the driving frequency, compared with the case where the serial resonance frequency F2 is twice of the driving frequency, and therefore the operating voltage of the switch element 11 can be lowered.

In addition, the drain-source voltage of the switch element 11 can be led to the bottom when the serial resonance frequency F2 is in the range of 2.5 times to 2.6 times of the driving frequency, regardless of whether the first resonant capacitor 8 has a small capacitance or large capacitance. Therefore, the operating voltage of the switch element 11 can be lowered.

Operating points can be obtained as described hereunder. The impedance of the resonant inverter 4a can be expressed as shown in FIG. 7. The inductance of the resonant choke coil 9 will be denoted by LF, the capacitance of the resonant capacitor 8 will be denoted by CF, and the parallel impedance composed of LF and CF will be denoted by ZF. An input impedance Zin can be expressed as equation (1), where LMR denotes the inductance of the resonant choke coil 9, CMR denotes the capacitance of the resonant capacitor 10, and ZMR denotes the serial impedance composed of LMR and CMR.

$$\frac{1}{Z_{in}} = \frac{1}{Z_F} + \frac{1}{Z_{MR}} \quad (1)$$

The parallel impedance ZF can be expressed as equation (2).

$$\frac{1}{Z_F} = \frac{1}{sL_F} + sC_F = \frac{1+s^2 L_F \cdot C_F}{sL_F} \quad (2)$$

$$Z_F = \frac{sL_F}{1+s^2 \cdot L_F \cdot C_F}$$

The serial impedance ZMR can be expressed as equation (3).

$$Z_{MR} = sL_{MR} + \frac{1}{sC_{MR}} = \frac{1+s^2 \cdot L_{MR} \cdot C_{MR}}{sC_{MR}} \quad (3)$$

Accordingly, Zin can be transformed as equation (4).

$$\frac{1}{Z_{in}} = \frac{1+s^2 \cdot L_F \cdot C_F}{sL_F} + \frac{sC_{MR}}{1+s^2 \cdot L_{MR} \cdot C_{MR}} \quad (4)$$

Upon rearranging the above, equation (5) can be established where Zin is expressed with angular frequency ω.

$$Z_{in} = \frac{i \cdot \omega \cdot L_F \cdot (1 - \omega^2 \cdot C_{MR} \cdot L_{MR})}{1 - \omega^2 \cdot (L_F \cdot C_F + L_{MR} \cdot C_{MR} + L_F \cdot C_{MR}) + \omega^4 \cdot (L_F \cdot C_F \cdot L_{MR} \cdot C_{MR})} \quad (5)$$

In this case, the resonance frequency based on LF and CF will be defined as equation (6).

$$\omega_{FF} = \frac{1}{\sqrt{L_F \cdot C_F}} \quad (6)$$

The resonance frequency based on LMR and CMR will be defined as equation (7).

$$\omega_{MM} = \frac{1}{\sqrt{L_{MR} \cdot C_{MR}}} \quad (7)$$

The resonance frequency based on LF and CMR will be defined as equation (8).

$$\omega_{FM} = \frac{1}{\sqrt{L_F \cdot C_{MR}}} \quad (8)$$

Equation (5) can be transformed as equation (9).

$$Z_{in} = \frac{i \cdot \omega \cdot L_F \cdot \left(1 - \frac{\omega^2}{\omega_{MM}^2}\right)}{1 - \omega^2 \cdot \left(\frac{1}{\omega_{FF}^2} + \frac{1}{\omega_{MM}^2} + \frac{1}{\omega_{FM}^2}\right) + \omega^4 \cdot \left(\frac{1}{\omega_{FF}^2 \cdot \omega_{MM}^2}\right)} \quad (9)$$

It is when the denominator is zero that the input impedance Zin becomes lowest, and therefore equation (10) can be established.

$$\omega \cdot L_F \cdot \left(1 - \frac{\omega^2}{\omega_{MM}^2}\right) = 0 \quad (10)$$

To set the condition for making the input impedance lowest to 0 times and twice of the driving frequency, equation (11) may be employed, where fs denotes the driving frequency and the angular frequency ωs is 2πfs.

$$\omega = 0 \quad (11)$$

$$\omega = \omega_{MM} = \frac{1}{\sqrt{L_{MR} \cdot C_{MR}}} = 2 \cdot \omega_s$$

In contrast, the condition for making the input impedance highest is the condition for making the denominator zero, and therefore equation (12) can be established.

$$1 - \omega^2 \cdot \left(\frac{1}{\omega_{FF}^2} + \frac{1}{\omega_{MM}^2} + \frac{1}{\omega_{FM}^2}\right) + \omega^4 \cdot \left(\frac{1}{\omega_{FF}^2 \cdot \omega_{MM}^2}\right) = 0 \quad (12)$$

To simplify this quartic equation, α and β can be defined as equation (13) and equation (14), respectively.

$$\alpha = \left(\frac{\omega_{FF}^2 \cdot \omega_{MM}^2}{2}\right) \cdot \left(\frac{1}{\omega_{FF}^2} + \frac{1}{\omega_{MM}^2} + \frac{1}{\omega_{FM}^2}\right) \quad (13)$$

$$\beta = \frac{2}{\left(\frac{1}{\omega_{FF}^2} + \frac{1}{\omega_{MM}^2} + \frac{1}{\omega_{FM}^2}\right)} \quad (14)$$

Equation (12) can be transformed as equation (15).

$$1 - \omega^2 \cdot \frac{2}{\beta} + \omega^4 \cdot \frac{1}{\alpha\beta} = 0 \quad (15)$$

Here, equation (16) and equation (17) can be led from equation (13) and equation (14), respectively.

$$\frac{2}{\beta} = \frac{1}{\omega_{FF}^2} + \frac{1}{\omega_{FM}^2} + \frac{1}{\omega_{MM}^2} \quad (16)$$

$$\frac{1}{\alpha\beta} = \frac{1}{\omega_{FF}^2 \cdot \omega_{MM}^2} \quad (17)$$

The solution of the quartic equation (15) is obtained as equation (18).

$$\omega = \begin{bmatrix} \sqrt{\alpha\beta \cdot \left(\dfrac{1}{\beta} + \dfrac{\sqrt{\dfrac{\alpha\beta - \beta^2}{\alpha\beta}}}{\beta}\right)} \\ -\sqrt{\alpha\beta \cdot \left[\dfrac{1}{\beta} + \dfrac{1}{\beta} \cdot \sqrt{\dfrac{1}{\alpha\beta} \cdot (\alpha\beta - \beta^2)}\right]} \\ \sqrt{\alpha\beta \cdot \left(\dfrac{1}{\beta} + \dfrac{\sqrt{\dfrac{\alpha\beta - \beta^2}{\alpha\beta}}}{\beta}\right)} \\ -\sqrt{\alpha\beta \cdot \left[\dfrac{1}{\beta} - \dfrac{1}{\beta} \cdot \sqrt{\dfrac{1}{\alpha\beta} \cdot (\alpha\beta - \beta^2)}\right]} \end{bmatrix} \quad (18)$$

However, since ω assumes a positive value, the first resonance point and the third resonance point where the input impedance Zin becomes highest can be obtained from equation (19) and equation (20), respectively.

$$\omega_1 = \sqrt{\alpha\left(1 - \sqrt{1 - \dfrac{\beta}{\alpha}}\right)} \quad (19)$$

$$\omega_3 = \sqrt{\alpha\left(1 + \sqrt{1 - \dfrac{\beta}{\alpha}}\right)} \quad (20)$$

To allow the input impedance Zin to have the first resonance point at once of the driving frequency and the third resonance point at three times thereof, equation (21) and equation (22) are defined.

$$\omega_1 = \omega_s \quad (21)$$
$$\omega_3 = 3 \cdot \omega_s$$

$$\omega_s = \sqrt{\alpha\left(1 - \sqrt{1 - \dfrac{\beta}{\alpha}}\right)} \quad (22)$$

$$3\omega_s = \sqrt{\alpha\left(1 + \sqrt{1 - \dfrac{\beta}{\alpha}}\right)}$$

Upon squaring the both sides of equation (22), equation (23) can be obtained.

$$\omega_s^2 = \alpha\left(1 - \sqrt{1 - \dfrac{\beta}{\alpha}}\right) \quad (23)$$

$$9 \cdot \omega_s^2 = \alpha\left(1 + \sqrt{1 - \dfrac{\beta}{\alpha}}\right)$$

$$\alpha - \omega_s^2 = \alpha \cdot \sqrt{1 - \dfrac{\beta}{\alpha}} \quad (24)$$

$$9 \cdot \omega_s^2 - \alpha = \alpha \cdot \sqrt{1 - \dfrac{\beta}{\alpha}}$$

Since the right-hand side of the left equation and that of the right equation are equal, equation (25) can be obtained by eliminating β to define α.

$$\alpha = 5 \cdot \omega_s^2 \quad (25)$$

Upon substituting equation (25) for the left equation of equation (23), β can be obtained as equation (26).

$$\beta = \dfrac{9 \cdot \omega_s^2}{5} \quad (26)$$

Upon substituting equation (26) and equation (11) for equation (14), equation (27) can be obtained.

$$\dfrac{9 \cdot \omega_s^2}{5} = \dfrac{2}{\left[\dfrac{1}{\omega_{FF}^2} + \dfrac{1}{(2\omega_s)^2} + \dfrac{1}{\omega_{FM}^2}\right]} \quad (27)$$

Upon solving equation (27) with respect to ωFF2, equation (28) can be obtained.

$$\omega_{FF}^2 = \dfrac{1}{\dfrac{1}{\omega_{FM}^2} - \dfrac{31}{36 \cdot \omega_s^2}} \quad (28)$$

Upon substituting equation (25) and equation (11) for equation (13), equation (29) can be obtained.

$$5 \cdot \omega_s^2 = \left[\dfrac{\omega_{FF}^2 \cdot (2\omega_s)^2}{2}\right] \cdot \left[\dfrac{1}{\omega_{FF}^2} + \dfrac{1}{(2\omega_s)^2} + \dfrac{1}{\omega_{FM}^2}\right] \quad (29)$$

Thus, upon substituting equation (28) for equation (29), equation (30) can be obtained.

$$5 \cdot \omega_s^2 = \left[\dfrac{\dfrac{1}{\dfrac{1}{\omega_{FM}^2} - \dfrac{31}{36 \cdot \omega_s^2}} \cdot (2\omega_s)^2}{2}\right] \cdot \left[\dfrac{1}{\dfrac{1}{\dfrac{1}{\omega_{FM}^2} - \dfrac{31}{36 \cdot \omega_s^2}}} + \dfrac{1}{(2\omega_s)^2} + \dfrac{1}{\omega_{FM}^2}\right] \quad (30)$$

Upon solving equation (30) with respect to ωFM, equation (31) can be obtained, since the resonance frequency is positive.

$$\omega_{FM} = \sqrt{\dfrac{12}{5}} \cdot \omega_s \quad (31)$$

Upon substituting equation (31) for equation (28), ωFF can be expressed as equation (32) since the resonance frequency is positive.

$$\omega_{FF} = \dfrac{3}{2} \cdot \omega_s \quad (32)$$

Upon substituting equation (32) for equation (6), LF can be expressed as equation (33).

$$L_F = \frac{1}{9 \cdot \pi^2 \cdot C_F \cdot f_s^2} \quad (33)$$

Upon substituting equation (31) for equation (8), equation (34) can be obtained.

$$C_{MR} = \frac{5}{12 \cdot L_F \cdot \omega_s^2} \quad (34)$$

Upon substituting equation (33) for equation (34), CMR can be expressed as equation (35).

By defining the resonant capacitance 8 (CF) based on the driving frequency fs and the drain-source (collector-emitter) capacitance of the switch element 11 through the foregoing procedure, the resonant capacitance 10 (CMR), the resonant choke coil 7 (LF), and the resonant choke coil 9 (LMR) can be obtained.

Table 1 represents the calculation results of the drain-source (collector-emitter) impedance based on the drain-source capacitance CF of the switch element 11 determined first through the foregoing procedure.

The results are based on the condition that the resonance frequency at which the input impedance Zin becomes lowest is denoted by F2 and the resonance frequencies F1, F3 at which the input impedance Zin becomes highest are set to once and three times of the driving frequency fs. Focusing exclusively on the resonant inverter, the input impedance Zin and the drain-source impedance of the switch element 11 are equal to each other.

TABLE 1

Calculated Values of Resonant Choke Coil and Resonant Capacitance (when CF is set to 440 pF)

| F2 | $L_F$ | $C_F$ | $L_{MR}$ | $C_{MR}$ |
|---|---|---|---|---|
| 1.25 fs | $L_F := \frac{25}{576 \cdot \pi^2 \cdot C_F \cdot f_s^2}$ | $C_F := 440 \cdot p$ | $L_{MR} := \frac{100}{1071 \cdot \pi^2 \cdot C_F \cdot f_s^2}$ | $C_{MR} := \frac{1071 \cdot C_F}{625}$ |
| 1.5 fs | $L_F := \frac{1}{16 \cdot \pi^2 \cdot C_F \cdot f_s^2}$ | $C_F := 440 \cdot p$ | $L_{MR} := \frac{1}{15 \cdot \pi^2 \cdot C_F \cdot f_s^2}$ | $C_{MR} := \frac{5 \cdot C_F}{3}$ |
| 1.75 fs | $L_F := \frac{49}{576 \cdot \pi^2 \cdot C_F \cdot f_s^2}$ | $C_F := 440 \cdot p$ | $L_{MR} := \frac{1}{16 \cdot \pi^2 \cdot C_F \cdot f_s^2}$ | $C_{MR} := \frac{64 \cdot C_F}{49}$ |
| 2 fs | $L_F := \frac{1}{9 \cdot \pi^2 \cdot C_F \cdot f_s^2}$ | $C_F := 440 \cdot p$ | $L_{MR} := \frac{1}{15 \cdot \pi^2 \cdot C_F \cdot f_s^2}$ | $C_{MR} := \frac{15 \cdot C_F}{16}$ |
| 2.25 fs | $L_F := \frac{9}{64 \cdot \pi^2 \cdot C_F \cdot f_s^2}$ | $C_F := 440 \cdot p$ | $L_{MR} := \frac{36}{455 \cdot \pi^2 \cdot C_F \cdot f_s^2}$ | $C_{MR} := \frac{455 \cdot C_F}{729}$ |
| 2.5 fs | $L_F := \frac{25}{144 \cdot \pi^2 \cdot C_F \cdot f_s^2}$ | $C_F := 440 \cdot p$ | $L_{MR} := \frac{25}{231 \cdot \pi^2 \cdot C_F \cdot f_s^2}$ | $C_{MR} := \frac{231 \cdot C_F}{625}$ |
| 2.75 fs | $L_F := \frac{121}{576 \cdot \pi^2 \cdot C_F \cdot f_s^2}$ | $C_F := 440 \cdot p$ | $L_{MR} := \frac{484}{2415 \cdot \pi^2 \cdot C_F \cdot f_s^2}$ | $C_{MR} := \frac{2415 \cdot C_F}{14641}$ |

$$C_{MR} = \frac{15 \cdot C_F}{16} \quad (35)$$

According to equation (11), ωs can be expressed as equation (36).

$$\omega_s = \frac{1}{2\sqrt{L_{MR} \cdot C_{MR}}} \quad (36)$$

Upon substituting equation (35) for equation (36), LMR can be expressed as equation (37).

$$L_{MR} = \frac{1}{15 \cdot \pi^2 \cdot C_F \cdot f_s^2} \quad (37)$$

Figure 2:
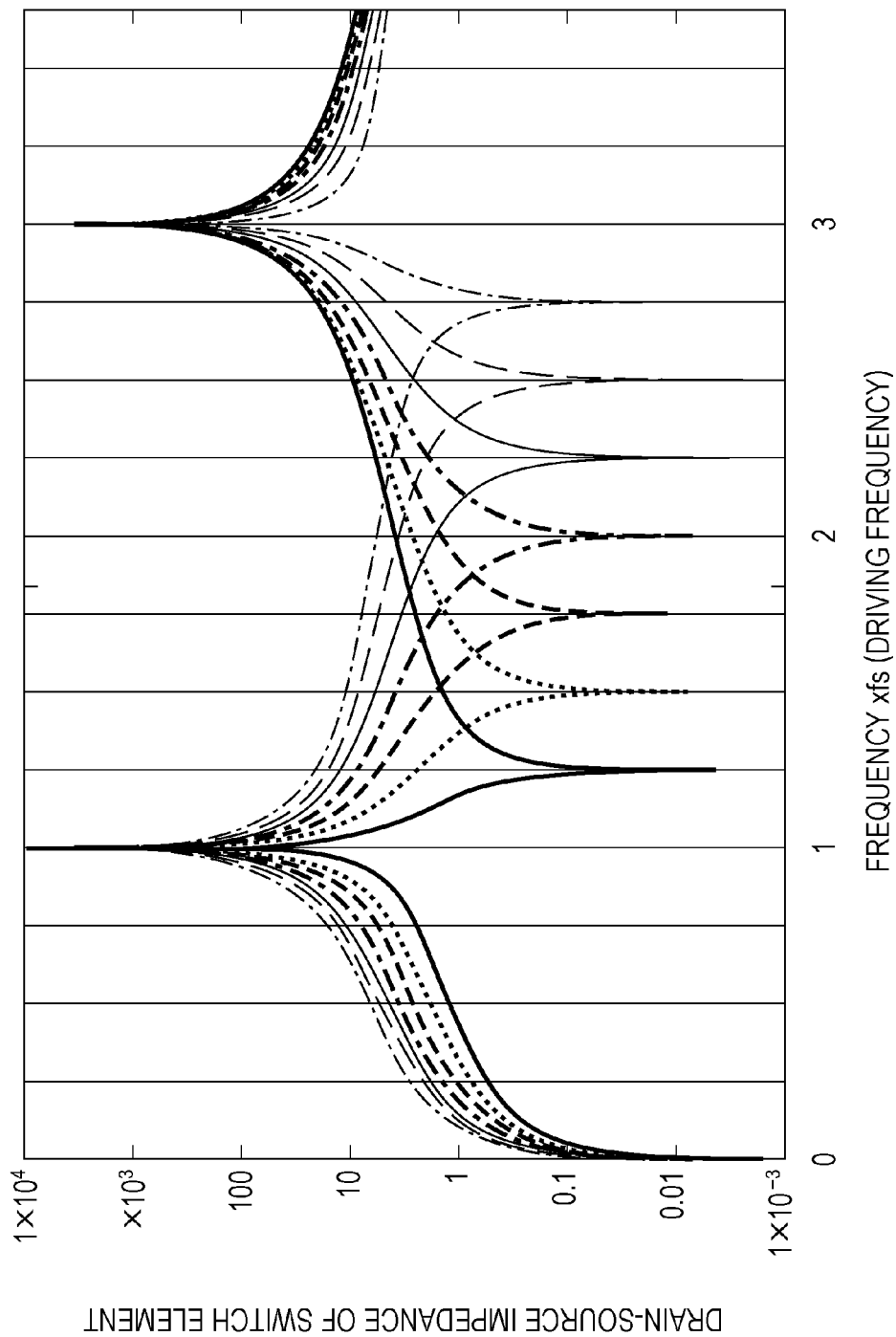
FIG. 2 is an explanatory graph showing drain-source (collector-emitter) impedance of a switch element in the resonant inverter according to the present invention.

The drain-source impedance of the switch element 11 according to Table 1 is shown in FIG. 2, and the relationship between the actual drain-source voltage of the switch element 11 and the resonance frequency is shown in FIG. 3.

Figure 4:
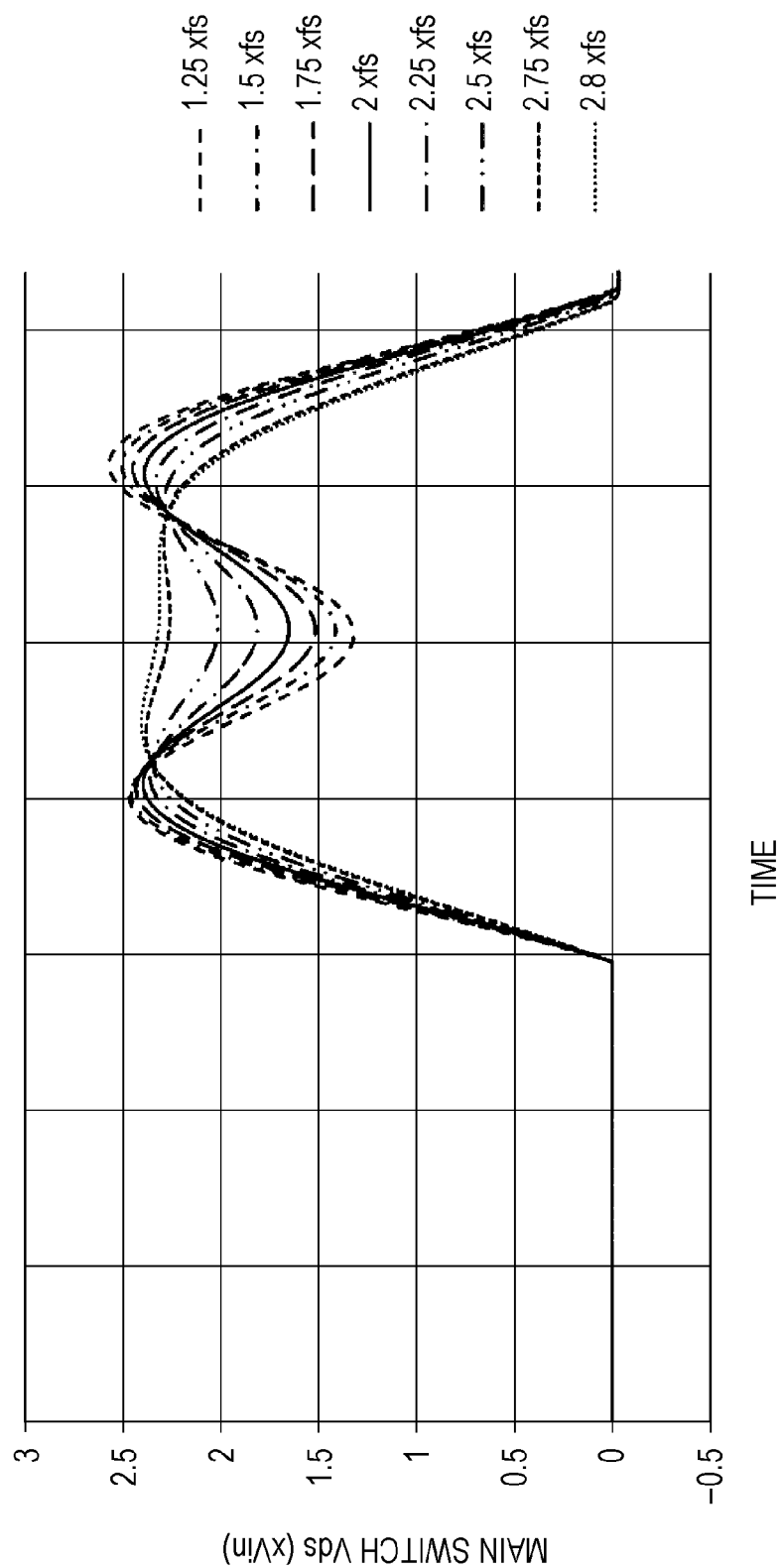
FIG. 4 is an explanatory graph showing drain-source voltage of the switch element according to the present invention.

In addition, the drain-source voltage of the switch element 11 is shown in FIG. 4.

As is apparent from FIG. 3 and FIG. 4, when the resonance frequency F2 is set to a value lower than twice of the driving frequency fs, the drain-source voltage of the switch element 11 becomes higher in any case, compared with the case where the resonance frequency F2 is set to twice of the driving frequency fs. In addition, when the resonance frequency F2 is set to a value higher than twice of the driving frequency fs, the drain-source voltage of the switch element 11 becomes lower in a certain range, compared with the case where the resonance frequency F2 is set to twice of the driving frequency fs. According to FIG. 3, in order to lower the drain-source operating voltage of the switch element, the serial resonance frequency F2 at which Zin becomes lowest may be set to a value higher than twice of the driving frequency fs but equal to or lower than 2.75 times.

The above is expressed in equation as 2 fs<F2≤2.75 fs. It is when F2 is in the range of 2.5 fs to 2.6 fs, that the drain-source voltage of the switch element 11 becomes lowest. It is also apparent, in view of FIG. 4, that although the drain-source voltage of the switch element 11 is excellent in vertical symmetry when F2 is 2 fs, the lowest operating voltage is obtained when F2 is 2.5 fs.

Upon applying the output of the resonant inverter according to the present invention to a resonant rectifier or general rectifier circuits, a resonant converter can be easily realized. The embodiment shown in FIG. 1 is merely an example representing the case where the resonant rectifier is added to the resonant inverter, and different configurations may be adopted.

Figure 5:
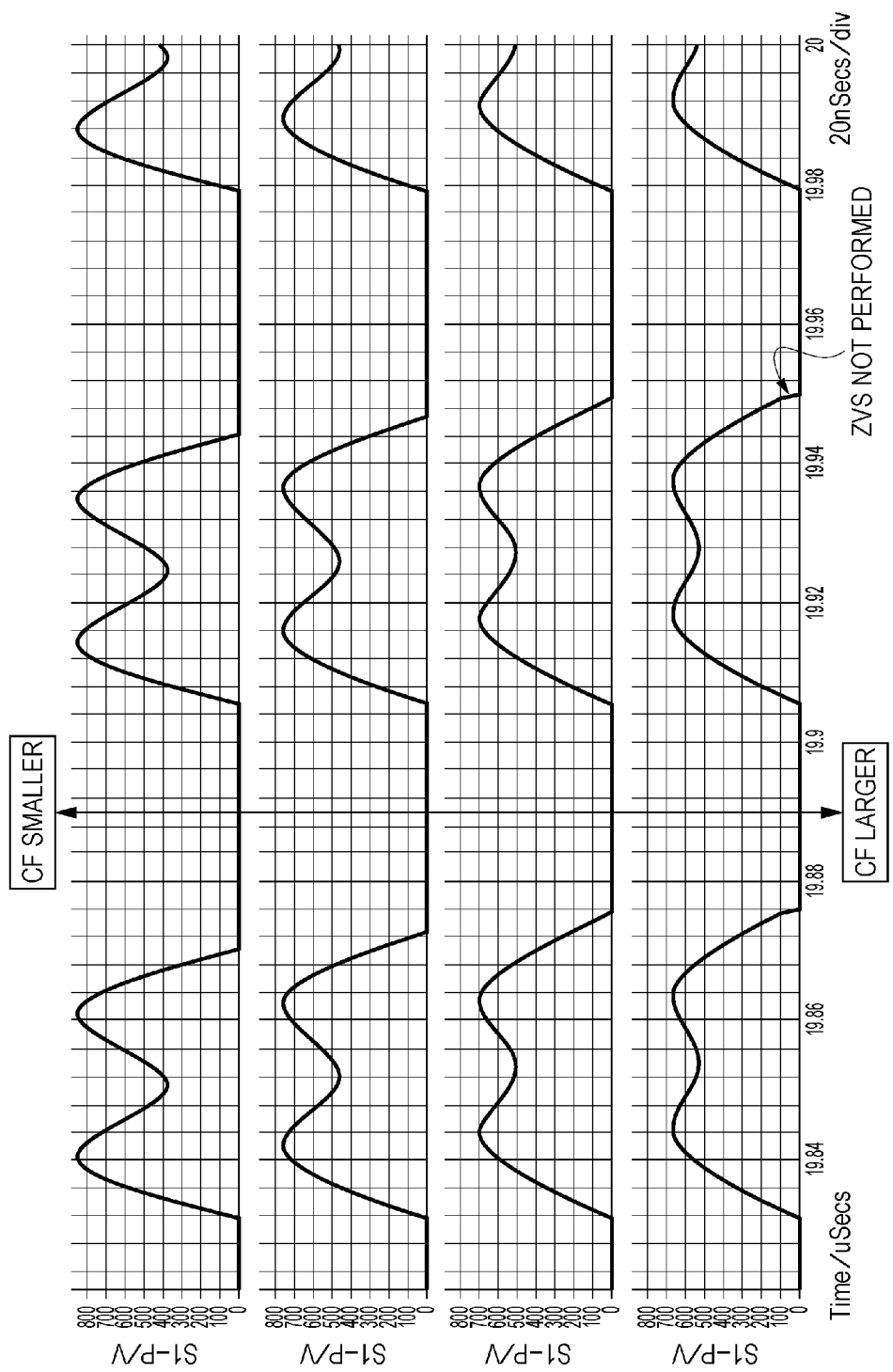
FIG. 5 is an explanatory graph showing an example of ZVS in the resonant inverter according to the present invention.
Figure 6:
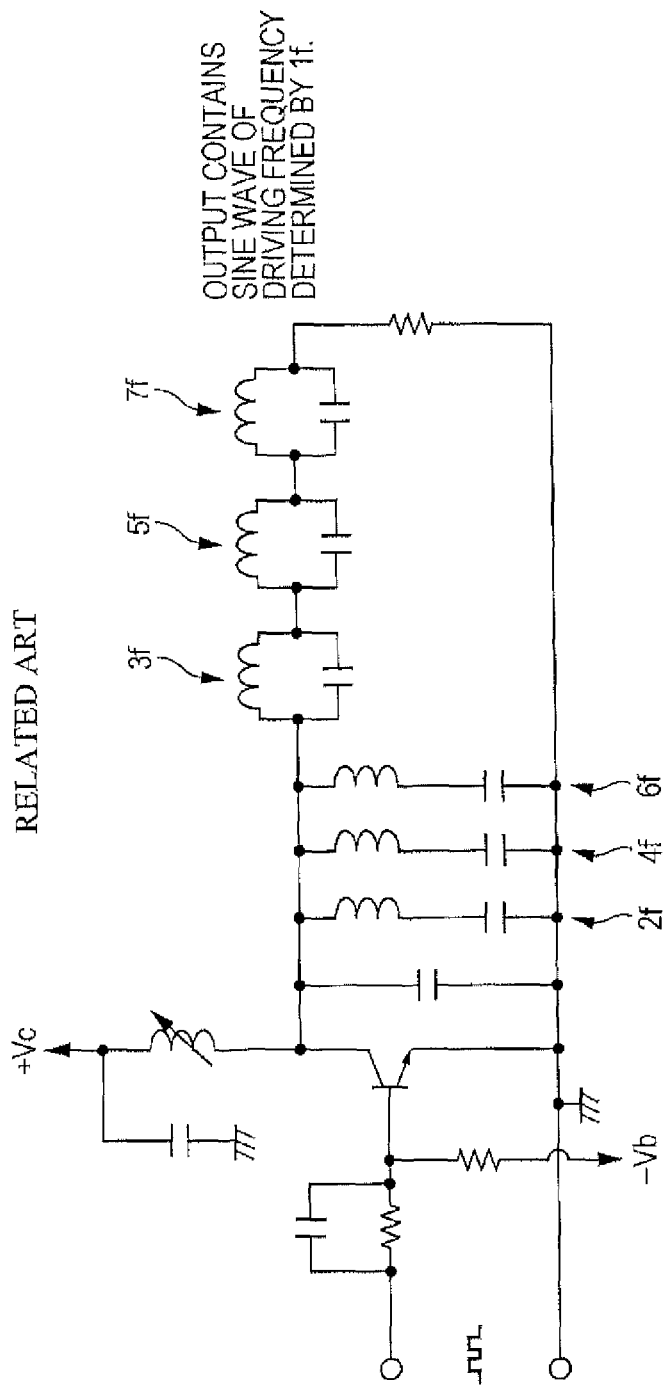
FIG. 6 is a circuit diagram for explaining an impact of even number components and odd number components in driving frequency of a conventional resonant inverter.

Further, the switch element has to be able to perform zero-volt switching (ZVS). Whether the ZVS can be performed may be decided on the basis of the drain-source voltage of the switch element 11. FIG. 5 shows waveforms representing the case where the ZVS is actually performed, and a waveform representing the case where the ZVS is not performed.

The horizontal axis of FIG. 5 represents the time, and the vertical axis represents the switch voltage, and four waveform examples are shown with respect to different levels of CF. The waveforms are different only in CF, and the resonance points F1, F2, F3 and the on-period are the same. When the resonance point and the on-period are the same, the switch voltage can be made lower with larger CF, however the larger CF prolongs the off-period, and among the illustrated waveform the bottom one with the largest CF fails to performs the. Whether the ZVS is performed can be decided according to whether the switch voltage is 0 V at the time that the switch is turned on. Thus, in order to lower the operating voltage, it is preferable to make CF as large as possible within the range that enables the ZVS.

As described above, the drain-source impedance of the switch element 11 can be easily calculated by determining the resonant capacitance CF including the drain-source capacitance of the switch element 11, and performing the calculation according to the foregoing procedure. The drain-source voltage of the switch element can be lowered by selecting the frequency F2 that makes the impedance so as to fall in a permissible fluctuation range, compared with the case where F2 is set to twice, and as result the reliable resonant inverter that barely affects the life span of the switch element can be obtained.

FIG. 5 illustrates the cases where the drain-source voltage of the switch element 11 satisfies the ZVS and does not satisfy the ZVS. Although the resonant capacitance 8 (CF) including the drain-source capacitance of the switch element 11 is determined first according to the proposed procedure, the value of the resonant capacitance 8 (CF) is unable to be made larger since increasing the driving frequency may disable the ZVS. The resonant capacitance 8 (CF) affects the off-period of the switch element 11, and therefore the resonant capacitance 8 (CF) has to be lowered, or the driving frequency fs or on-duty period has to be reduced, when the ZVS is unable to be performed. Accordingly, it has to be confirmed whether the ZVS can be performed with the driving frequency fs, in the case of determining the resonant capacitance 8 (CF) first in the designing process. Although a smaller value of the resonant capacitance 8 (CF) facilitates the ZVS to be performed, the lower resonant capacitance 8 (CF) is trade-off with the operating voltage of the switch element 11. Therefore, it is preferable to increase the resonant capacitance 8 (CF) within the range that allows the ZVS to be performed with the driving frequency, in order to lower the drain-source voltage of the switch element 11. As shown in FIG. 3, in the case where the capacitor having the largest capacitance is added to the resonant capacitance 8(CF), the ZVS is unable to be performed when the serial resonance frequency F2 defined by the second capacitor and the second coil is set to 2.95 times of the driving frequency fs. In the case of employing the resonant capacitance 8 (CF) having such large capacitance, the ZVS is unable to be performed unless the frequency is lowered, or the on-duty period is shortened so as to secure the off-period.

The resonant inverter proposed as above is capable of lowering the operating voltage of the switch element, easily realizing the ZVS, and allowing the drive circuit to perform high-frequency operation, and is therefore applicable to the driving frequency as high as several hundred MHz. In addition, significant reduction in size and improvement in efficiency can be realized by employing a next-generation semiconductor such as GaN and SiC.

What is claimed is:

1. A resonant inverter comprising:
a switch element; and
at least four energy storage elements,
the resonant inverter being configured so as to satisfy 2 fs<F2≤2.75 fs, where fs denotes a driving frequency in which the switch element is driven, and F2 denotes a resonance frequency generated by at least two of the energy storage elements,
wherein the resonance frequency F2 includes at least three resonance points, and
when a first resonance point is fixed at the driving frequency and a third resonance point is fixed at three times of the driving frequency, a resonance point that satisfies 2 fs<F2≤2.75 fs is a second resonance point.

2. The resonant inverter according to claim 1,
wherein the four energy storage elements are, respectively:
a first coil provided between a first input terminal and the switch element;
a first capacitor disposed parallel to the switch element; and
a second coil and a second capacitor provided between the first coil and a second input terminal, and serially connected to each other.

3. The resonant inverter according to claim 2,
wherein an amplitude indicating the impedance of the switch element becomes lowest when the resonance frequency F2 based on serially resonance of the second coil and the second capacitor satisfies 2.5 fs F2≤2.6 fs.

4. A switching power source unit comprising:
the resonant inverter according to claim 3; and
a rectifier circuit connected to the resonant inverter.

5. The resonant inverter according to claim 2,
wherein the switch element is configured to perform zero-volt switching.

6. A switching power source unit comprising:
the resonant inverter according to claim 2; and
a rectifier circuit connected to the resonant inverter.

7. The resonant inverter according to claim 1,
wherein the switch element is configured to perform zero-volt switching.

8. The resonant inverter according to claim 7,
wherein an amplitude indicating the impedance of the switch element becomes lowest when the resonance frequency F2 based on serially resonance of the second coil and the second capacitor satisfies 2.5 fs≤F2≤2.6 fs.

9. A switching power source unit comprising:
the resonant inverter according to claim 7; and
a rectifier circuit connected to the resonant inverter.

10. A switching power source unit comprising:
the resonant inverter according to claim 1; and
a rectifier circuit connected to the resonant inverter.

11. The resonant inverter according to claim 1,
wherein an amplitude indicating the impedance of the switch element becomes lowest when the resonance frequency F2 based on serially resonance of the second coil and the second capacitor satisfies 2.5 fs≤F2≤2.6 fs.

* * * * *